United States Patent [19]

Mitamura et al.

[11] Patent Number: 5,357,065
[45] Date of Patent: Oct. 18, 1994

[54] CIRCUIT UNIT FOR ELECTRONIC INSTRUMENT HAVING KEY-PAD ARRANGEMENT

[75] Inventors: Fumio Mitamura; Mitsuo Inagaki, both of Kawasaki, Japan

[73] Assignee: Fujitsu Limited, Kawasaki, Japan

[21] Appl. No.: 88,344

[22] Filed: Jul. 9, 1993

[30] Foreign Application Priority Data

Jul. 10, 1992 [JP] Japan .................. 4-183580

[51] Int. Cl.⁵ ............................................. H01H 13/70
[52] U.S. Cl. .................................... 200/5 A; 361/749; 200/512; 200/513
[58] Field of Search ................ 200/5 R, 5 A, 512–517, 200/292; 361/748–751; 174/250, 253, 254, 255, 259, 268

[56] References Cited

U.S. PATENT DOCUMENTS

| | | | |
|---|---|---|---|
| 4,245,138 | 1/1981 | Harper .................. | 200/5 A |
| 4,314,117 | 2/1982 | Ditzig .................. | 200/5 A X |
| 4,349,712 | 9/1982 | Michalski .................. | 200/5 A X |
| 4,609,792 | 9/1986 | Levasseur .................. | 200/5 A |
| 4,916,275 | 4/1990 | Almond .................. | 200/5 A X |
| 5,294,762 | 3/1994 | Kaizu et al. .................. | 200/513 |

*Primary Examiner*—J. R. Scott
*Attorney, Agent, or Firm*—Armstrong, Westerman, Hattori, McLeland & Naughton

[57] ABSTRACT

A circuit unit is used in an electronic instrument having a key-pad arrangement, such as a portable telephone, and comprises a printed circuit board, a flexible switch circuit sheet attached to the printed circuit board and having a plurality of switch pads arranged thereon, and at least one circuit pattern formed in the flexible switch circuit sheet so as to construct a switch circuit together with the switch pads. The circuit pattern includes a plurality of line sections extended between the switch pads, and a plurality of terminals provided along a peripheral edge of the flexible switch circuit sheet for establishing an electrical connection between the printed circuit board and the flexible switch circuit sheet.

10 Claims, 7 Drawing Sheets

CIRCUIT UNIT FOR ELECTRONIC INSTRUMENT HAVING KEY-PAD ARRANGEMENT

BACKGROUND OF THE INVENTION

1) Field of the Invention

The present invention relates to a circuit unit incorporated in an electronic instrument having a key-pad arrangement, such as a portable telephone.

2) Description of the Related Art

In general, such a circuit unit comprises a printed circuit board, a flexible switch circuit sheet attached to the printed circuit board and having a plurality of switch pads arranged thereon, and a key pad board placed on the flexible switch circuit sheet and having a plurality of key pads correspondingly arranged thereon with respect to the arrangement of the switch pads. The flexible switch circuit sheet has at least one circuit pattern formed therein to construct a switch circuit together with the switch pads. The circuit pattern includes a plurality of line sections extended between the switch pads, and a plurality of terminals formed on the flexible switch circuit sheet for establishing an electrical connection between the flexible switch circuit sheet and the printed circuit board. Namely, the terminals of the circuit pattern are soldered to terminal pads formed on the printed circuit board, so that a switch on the flexible switch circuit sheet is electrically connected to a control circuit on the printed circuit board. Thus, when the switch pad concerned is depressed by the corresponding key pad and turned ON, the signal can be received by the control circuit of the printed circuit board.

Conventionally, the terminals of the circuit pattern are provided on and gathered at, a localized zone of the flexible switch circuit sheet, and thus the total length of the line sections included in the circuit pattern becomes relatively long, because the line sections must be extended to the terminals provided at the localized zone. Of course, the total length of line sections should be reduced as much as possible, so that the switch circuit can be more effectively protected from noise. Also, the longer the total length of the line sections of the circuit pattern, the larger the size of the flexible switch circuit sheet.

Furthermore, a flexibility of the flexible switch circuit sheet is not uniform because the line sections included therein are concentrated toward the gathered terminals. Accordingly, when the switch pad concerned is depressed by the corresponding key pad, a concentration of stress occurs in the circuit unit so that it is susceptible to local damage.

SUMMARY OF THE INVENTION

Accordingly, an object of the present invention is to provide a circuit unit incorporated in an electronic instrument having a key-pad arrangement, wherein the above-mentioned defects or disadvantages involved in the conventional type of circuit unit can be eliminated.

In accordance with a first aspect of the present invention, there is provided a circuit unit incorporated in an electronic instrument having a keypad arrangement, comprising: a printed circuit board; a flexible switch circuit sheet attached to the printed circuit board and having a plurality of switch pads arranged thereon; and at least one circuit pattern formed in the flexible switch circuit sheet so as to construct a switch circuit together with the switch pads, the circuit pattern including a plurality of line sections extended between the switch pads, and a plurality of terminals provided along a peripheral edge of the flexible switch circuit sheet for establishing electric connection between the printed circuit board and the flexible switch circuit sheet. The flexible switch circuit sheet may have a multi-layer structure, the central film layer of which has two circuit patterns formed on sides thereof for constructing the switch circuit.

Preferably, the flexible switch circuit sheet is adhered to the printed circuit board through the intermediary of a self-adhesive or pressure-sensitive adhesive layer. Also, preferably, the terminals are formed in substantially the same manner a via-hole or through-hole is formed in a printed circuit board or sheet. Each of the terminals may be soldered to a corresponding terminal pad formed on the printed circuit board, and each of the switch pads may comprise a diaphragm pad formed of a suitable metal material such as copper.

BRIEF DESCRIPTION OF THE DRAWINGS

Other objects and advantages of the present invention will be better understood from the following description, with reference to the accompanying drawings, in which.

DESCRIPTION OF THE PREFERRED EMBODIMENTS

Figure 1:
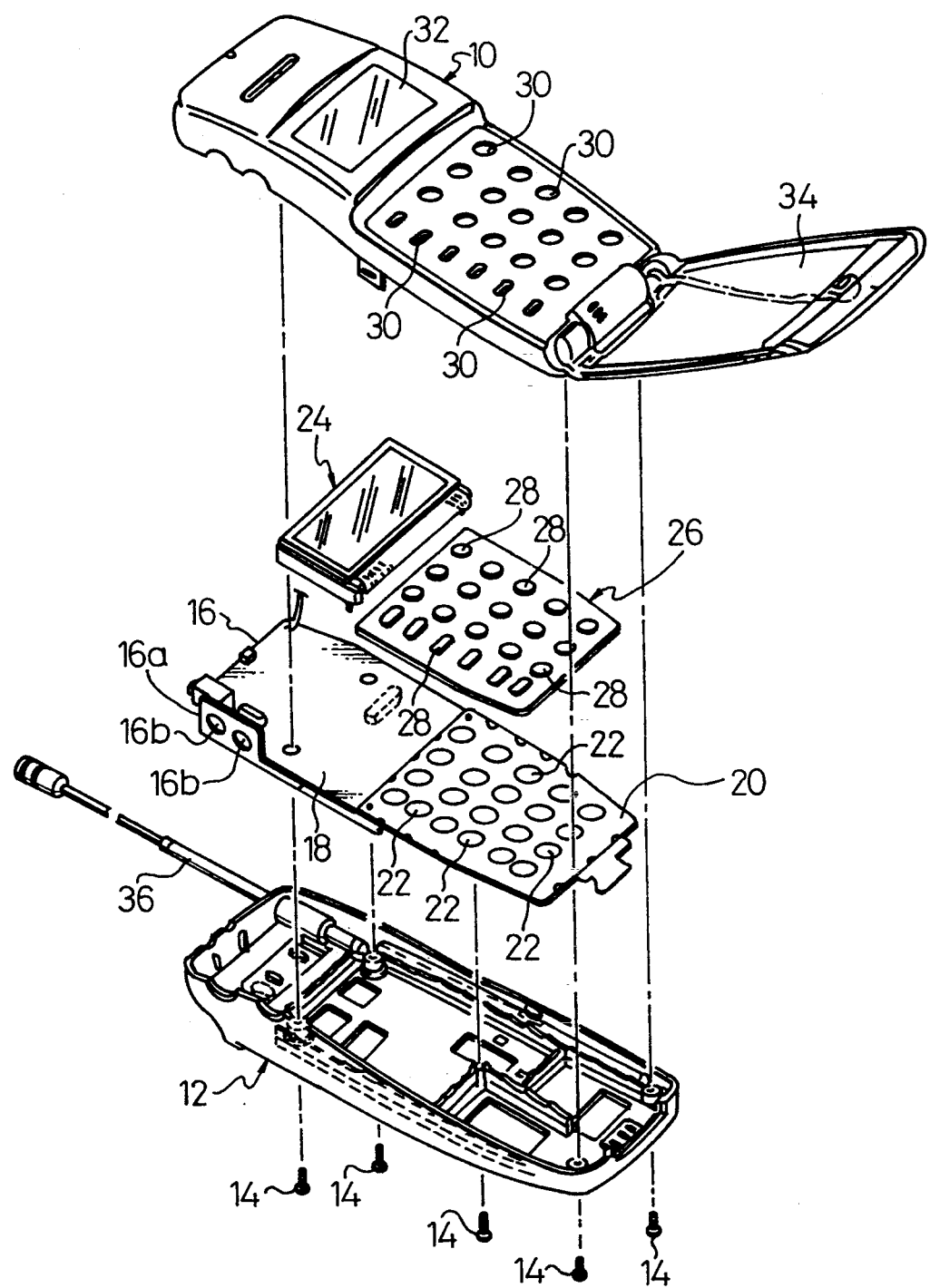
FIG. 1 is an exploded perspective view showing a portable telephone including a circuit unit constructed according to the present invention.

FIG. 1 shows a portable telephone as a representative of an electronic instrument having a key-pad arrangement, which comprises a front casing half 10, a rear casing half 12 attached thereto by screws 14, and a circuit unit 16 accommodated in an interior defined by the front and rear casing halves 10 and 12. The circuit board unit 16 is constructed in accordance with the present invention, as stated hereinbefore in detail, and includes a printed circuit board 18 having various electronic components (not shown) mounted thereon, and a flexible switch circuit sheet 20 attached to a half area of the printed circuit board 18 and having a plurality of switch pads 22 arranged thereon. The portable telephone further comprises a liquid crystal display unit 24 mounted on the other half area of the printed circuit board 18, and a key pad board 26 placed on the flexible switch circuit sheet 20 and having a plurality of depressable key pads 28 correspondingly arranged with respect to the arrangement of the switch pads 22 of the flexible switch circuit sheet 20.

As shown in FIG. 1, the front casing half 10 has a plurality of key pad holes 30 correspondingly arranged with respect to the arrangement of the key pads 28 of the key pad board 26, and each of the key pads 28 is projected from the corresponding key pad hole 30 of the front casing half 10 when assembled. Also, the front casing half 10 has a transparent window 32 for viewing the liquid crystal display unit 24, and a movable lid 34 for covering the arrangement of the key pads 28. The rear casing half has a telescopic antenna 36 projected therefrom.

Figure 2:
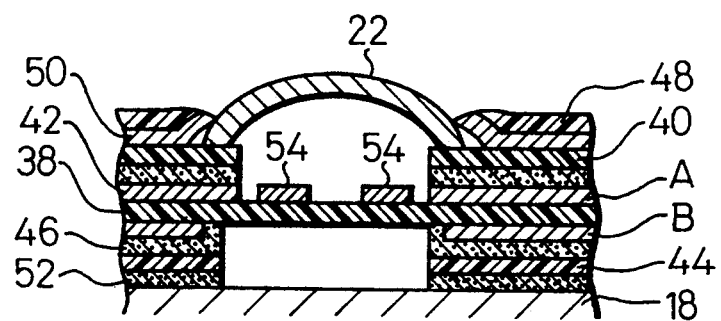
FIG. 2 is a partial cross-sectional view of the circuit unit shown in FIG. 1.

As shown in FIG. 2, the flexible switch circuit sheet 20 has a multi-layer structure including a central polyimide film 38 having front and rear circuit patterns A and B formed the sides thereof and made of copper foil, a front polyimide film 40 adhered to the front side of the central polyimide film 38 by a curable adhesive 42, and a rear polyimide film 44 adhered to the rear side of the central polyimide film 38 by a curable adhesive layer 46. The front polyimide film 40 is also covered by a polyethylene terephthalate film 48 adhered thereto by a self-adhesive or pressure-sensitive adhesive layer 50. The flexible switch circuit sheet 20 is attached to the printed circuit board 18 by a self-adhesive or pressure-sensitive adhesive layer 52. As apparent from FIG. 2, the central polyimide film 38 is exposed at a location at which each of the switch pads 22 is arranged, and contacts 54 are formed on a front side of the exposed location of the central polyimide film 38. The switch pad 22 comprises a diaphragm pad 22 formed of a suitable metal material such as copper. When the key pad 28 concerned is depressed, the corresponding diaphragm pad 22 is deformed so as to establish an electrical connection between the contacts 54, i.e., the switch pad 22 is turned ON. Note, although the flexible switch circuit sheet 20 may be adhered to the printed circuit board 18 by a curable adhesive, the attachment of the flexible switch circuit sheet 20 to the printed circuit board 18 by the self-adhesive or pressure-sensitive adhesive layer 52 is preferable because the self-adhesive or pressure-sensitive adhesive layer 52 serves as a cushion layer during the depression of the key pad 28.

Figure 3:
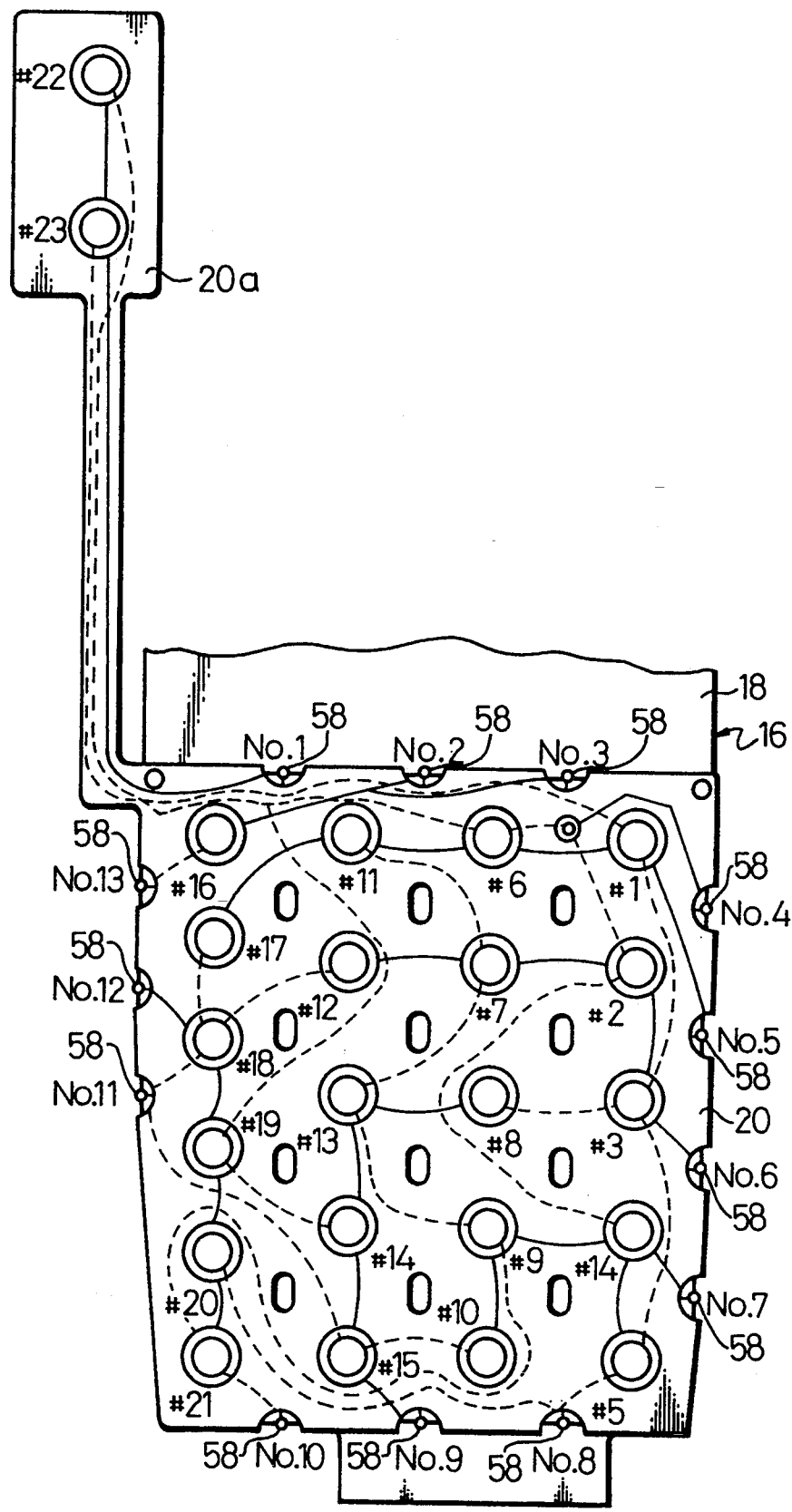
FIG. 3 is an enlarged partial plan view of a flexible switch circuit sheet forming a part of the circuit unit shown in FIG. 1.
Figure 4:
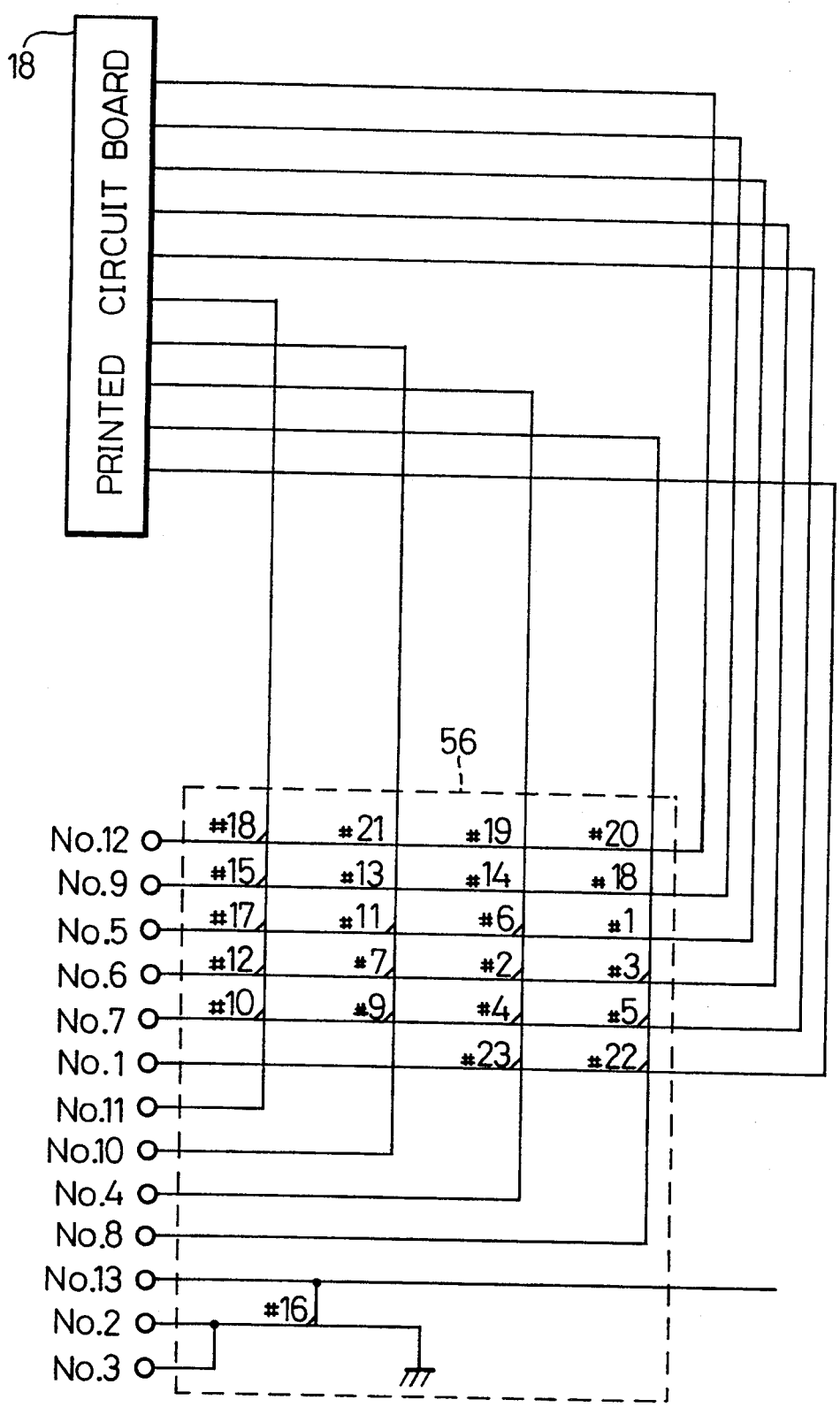
FIG. 4 is a switch circuit diagram of the flexible switch circuit sheet shown in FIG. 3.

With reference to FIG. 3, the switch pads (22) of the flexible switch circuit sheet 20 are indicated by references #1 through #23. Also, in this drawing, the front circuit pattern (A) is shown by a plurality of solid line sections extended between the switch pads, and the rear circuit pattern (B) is shown by a plurality of broken line sections extended between the switch pads, whereby a switch circuit 56 is formed as shown in FIG. 4. Further, the front and rear circuit patterns (A, B) include a plurality of terminals 58 provided along a peripheral edge of the flexible switch circuit sheet 20, and the switch circuit 56 is electrically connected to the printed circuit board 18 through the terminals 58, as shown in FIG. 4. Note, in FIG. 3, the terminals 58 are numbered by No. 1 through No. 13, and these numbers correspond to that shown in FIG. 4. The printed circuit board 18 includes a microcomputer (not shown) which repeatedly addresses the switch pads #1 through #23 in a regular sequence and at regular intervals of a given very short time (for example, 10 ms) to determine whether each of the switch pads #1 through #23 is turned ON. Note, this addressing manner is well known in this field.

Although not illustrated in FIG. 1 for convenience, the flexible switch sheet 20 has a portion 20a integrally extended therefrom, as shown in FIG. 3, and the switch pads #22 and #23 are arranged on the extended portion 20a. As shown in FIG. 1, the printed circuit board 18 is provided with a side wall portion 16a fixed thereto, and this side wall portion 16a has two key pad holes 16b which receive two key pads (not shown) for the switch pads #22 and #23, respectively.

Figure 5:
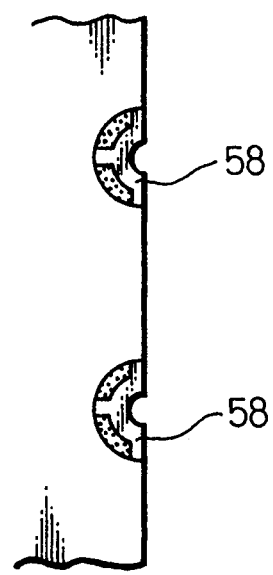
FIG. 5 is a partial enlarged view of the flexible switch circuit sheet shown in FIG. 3, showing terminals provided along a peripheral edge thereof.

As best shown in FIG. 5, each of the terminals 58 is exposed by the multi-layer structure of the flexible switch circuit sheet 20, and thus can be soldered to a corresponding terminal pad (not shown) formed on the printed circuit board 18. The terminals 58 are formed in substantially the same manner as a via-hole or through-hole is formed in a printed circuit board or sheet. In particular, the multi-layer structure as shown in FIG. 2 is previously produced to a larger size than that of the flexible switch circuit sheet 20 shown in FIG. 3, and thirteen through-holes are actually formed at the locations corresponding to the thirteen terminals 58. Then, the multi-layer structure is trimmed and shaped as shown in FIG. 3, such that a half portion of each through-hole is left as the terminal 58.

The soldering of the terminals 58 to the terminal pads of the printed circuit board 18 may be carried out by as follows:

First, a solder paste is printed on the terminals pads of the printed circuit board 18 in the well-known manner, and then the flexible switch circuit sheet 20 is placed on the printed circuit board 18 such that the terminals 58 are registered with the terminal pads of the printed circuit board 18. Thereafter, a laser beam is projected on each of the terminals 58, and thus the printed solder paste is thermally fused, whereby the terminals 58 are soldered to the terminals pads of the printed circuit board 18.

Figure 6A:
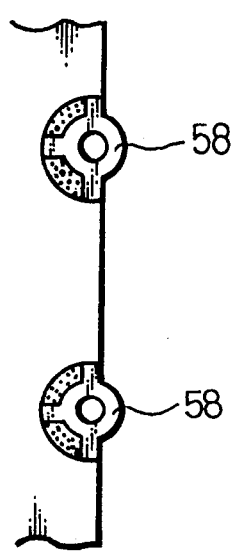
FIGS. 6A, 6B, and 6C each is a view similar to FIG. 5, showing a modification of the terminals of the flexible switch circuit sheet.
Figure 6B:
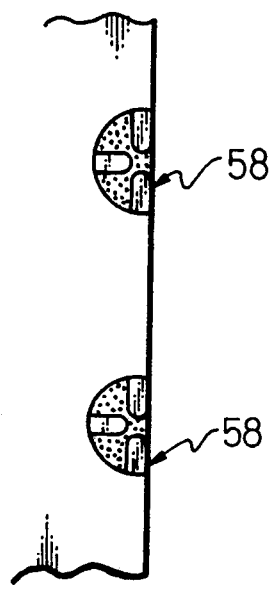
Figure 6C:
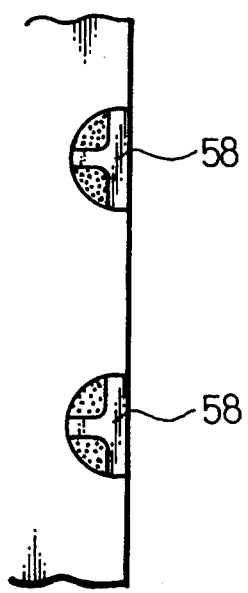

FIGS. 6A, 6B, and 6C show a modification of the terminal 58, and these modified terminals can be soldered to the terminals pads of the printed circuit board 18 in the same manner as mentioned above.

Figure 7:
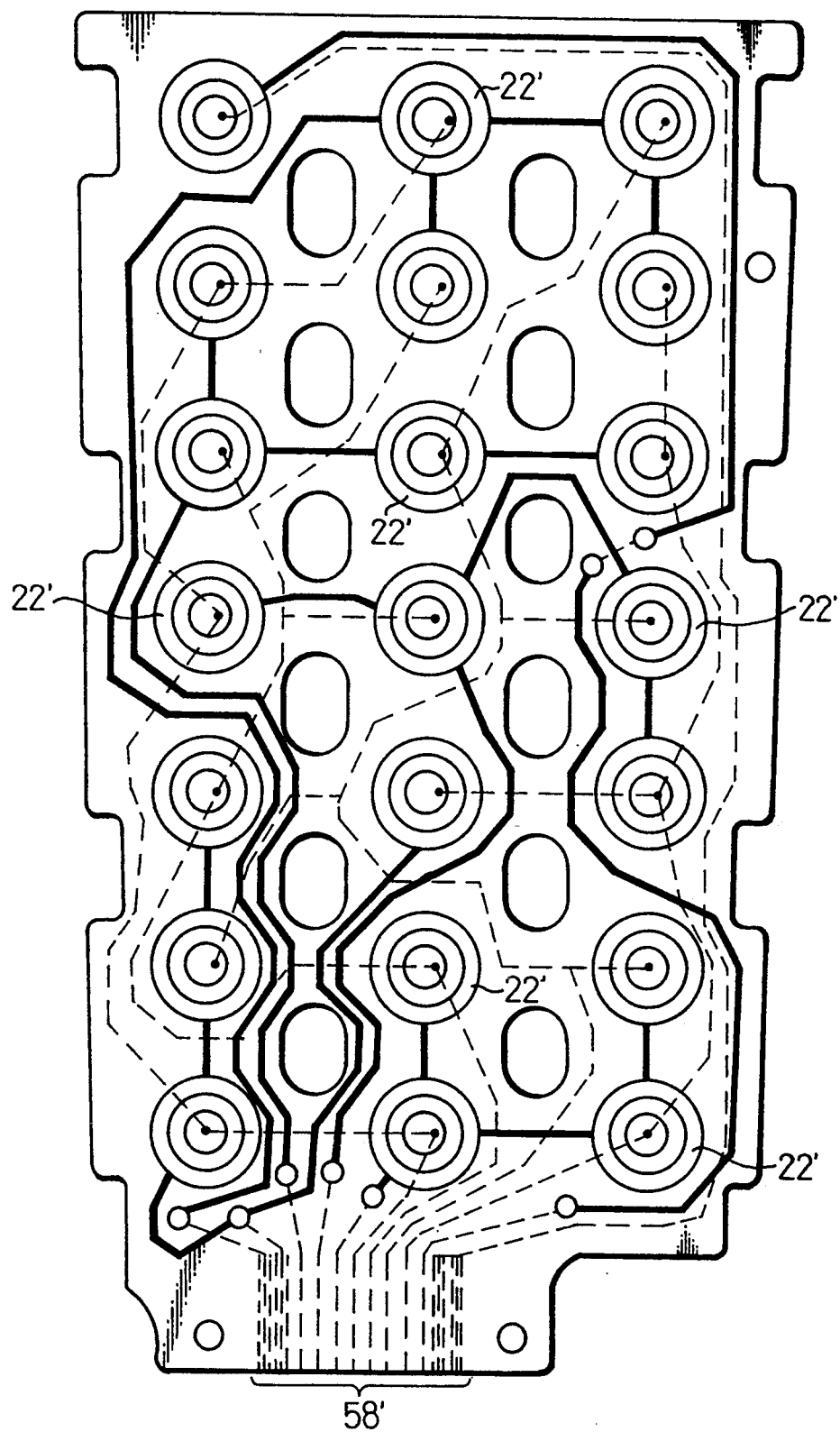
FIG. 7 is a plan view corresponding to FIG. 3, showing a conventional type of flexible switch circuit sheet.

FIG. 7 shows a conventional flexible switch circuit sheet which is produced by the same manner as stated with reference to FIG. 2. Similar to FIG. 3, the conventional circuit board includes a front circuit pattern as shown by a plurality of solid line sections extended between the switch pads 22', and a rear circuit pattern as shown by a plurality of broken line sections extended between the switch pads 22', but the circuit patterns include a plurality of terminals 58' provided on and gathered at a localized zone of the flexible switch circuit sheet. Accordingly, the circuit patterns of the conventional flexible switch circuit sheet are more complex in comparison with the circuit patterns A and B of the flexible switch circuit sheet 20, and the total length of the line sections included in the conventional circuit pattern is considerably larger than that of the line sections included in the circuit patterns A and B. Also, the flexibility of the conventional flexible switch circuit sheet is not uniform because the line sections included therein are concentrated toward the gathered terminals 58', but a flexibility of the flexible switch circuit sheet 20 is relatively uniform because the terminals 58 are provided along the sides thereof.

Finally, it will be understood by those skilled in the art that the foregoing description is of preferred embodiments of the present invention, and that various changes and modifications can be made without departing from the spirit and scope thereof.

We claim:

1. A circuit unit incorporated in an electronic instrument having a key-pad arrangement, which unit comprises:

a printed circuit board;

a flexible switch circuit sheet attached to said printed circuit board and having a plurality of switch pads arranged thereon; and at least one circuit pattern formed in said flexible switch circuit sheet so as to construct a switch circuit together with said switch pads, said circuit pattern including a plurality of line sections extended between said switch pads, and a plurality of terminals provided along a peripheral edge of said flexible switch circuit sheet for establishing electric connection between said printed circuit board and said flexible switch circuit sheet.

2. A circuit unit as set forth in claim 1, wherein said flexible switch circuit sheet is adhered to said printed circuit board through the intermediary of a self-adhesive or pressure sensitive adhesive layer.

3. A circuit unit as set forth in claim 1, wherein each of said terminals is soldered to a corresponding terminal pad formed on said printed circuit board.

4. A circuit unit as set forth in claim 1, wherein said terminals are formed in substantially the same manner as a via-hole or through-hole is formed in a printed circuit board or sheet.

5. A circuit unit as set forth in claim 1, wherein each of said switch pads comprises a diaphragm pad formed of a suitable metal material such as copper.

6. A circuit unit as set forth in claim 1, wherein said flexible switch circuit sheet has a multi-layer structure, a central film layer of which has two circuit patterns formed on sides thereof for constructing said switch circuit.

7. A circuit unit as set forth in claim 6, wherein said multi-layer structure is adhered to said printed circuit board through the intermediary of a self-adhesive or pressure-sensitive adhesive layer.

8. A circuit unit as set forth in claim 6, wherein each of said terminals is soldered to a corresponding terminal pad formed on said printed circuit board.

9. A circuit unit as set forth in claim 6, wherein said terminals are formed in substantially the same manner as a via-hole or through-hole is formed in a printed circuit board or sheet.

10. A circuit unit as set forth in claim 6, wherein each of said switch pads comprises a diaphragm pad formed of a suitable metal material such as copper.

* * * * *